United States Patent [19]

Bodo

[11] Patent Number: 5,190,251
[45] Date of Patent: Mar. 2, 1993

[54] VIBRATION-DAMPING FASTENING ELEMENT

[75] Inventor: Giuseppe Bodo, I-Vercelli, Italy

[73] Assignee: A. Raymond et Cie., Grenoble, France

[21] Appl. No.: 745,853

[22] Filed: Aug. 16, 1991

[30] Foreign Application Priority Data

Aug. 16, 1990 [DE] Fed. Rep. of Germany ... 9011879[U]

[51] Int. Cl.⁵ .............................................. F16L 3/00
[52] U.S. Cl. .................................. 248/73; 248/224.3; 248/68.1; 248/589
[58] Field of Search ............... 248/610, 73, 68.1, 74.2, 248/60, 617, 634, 316.7, 160, 51, 52, 224.3, 104, 589

[56] References Cited

U.S. PATENT DOCUMENTS

| 1,519,341 | 12/1924 | Smith | 248/52 |
|---|---|---|---|
| 2,453,980 | 11/1948 | Hartman | 248/73 X |
| 2,495,848 | 1/1950 | Kiesel | 248/73 X |
| 3,471,109 | 10/1969 | Meyer | 248/68.1 |
| 3,960,350 | 6/1976 | Tardoskegyi | 248/589 |
| 4,467,987 | 8/1984 | Small | 248/68.1 |
| 4,541,602 | 9/1985 | Potzas | 248/68.1 X |
| 4,655,424 | 4/1987 | Oshida | 248/73 |
| 4,989,822 | 2/1991 | Fannon | 248/74.2 X |

FOREIGN PATENT DOCUMENTS

| 1189026 | 9/1959 | France | 248/73 |
|---|---|---|---|
| 678688 | 9/1952 | United Kingdom | 248/60 |

Primary Examiner—Karen J. Chotkowski
Attorney, Agent, or Firm—Finnegan, Henderson, Farabow, Garrett & Dunner

[57] ABSTRACT

A vibration-damping fastening element for holding pipelines having a base adapted to be anchored to a carrier plate and suspended retention means for holding the pipelines spaced from and connected to the base of two or more flexible webs, the improvement wherein said flexible connecting webs are of meander-shape.

2 Claims, 1 Drawing Sheet

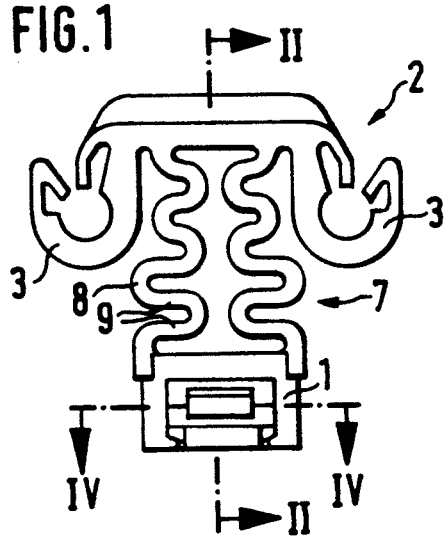
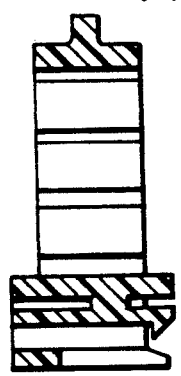
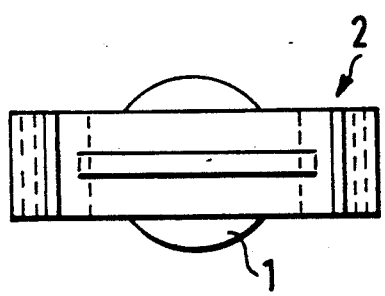
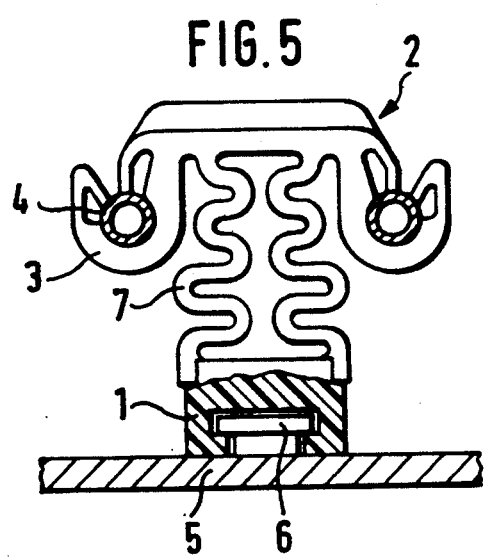

VIBRATION-DAMPING FASTENING ELEMENT

BACKGROUND OF THE INVENTION

This invention relates to a vibration-damping fastening element for pipelines, especially for the brake lines of motor vehicles.

A fastening element of this type is shown in published U.K. patent application No. 2166794. In this fastening element, flexible connecting webs are provided between the base of the element and the retention means for the brake lines that have the purpose of damping the vibrations that occur in the braking system to prevent them from being transmitted back to the body of the vehicle. To protect these webs from the action of excessively high forces, the retention means or shell is provided with rigid protuberances or projections which cooperate with oppositely situated projections on the base to limit travel of the shell, but are spaced a distance therefrom to provide some deflection. However, to achieve this, the retention shells end up being very close to the base or even may be embedded in it, but in a suspended fashion. Upon installation, the brake lines may also press towards one side or the other with the result that deflection of the shell is restricted or even prevented in that direction.

It is the object of the present invention therefore to provide a fastening element for brake lines having a flexible connection between the base and retention shells in such a way that the latter are held at a greater distance above the base and without any lateral limitation.

SUMMARY OF THE INVENTION

This object is achieved according to the present invention by providing in a vibration-damping fastening element for holding pipelines having a base adapted to be anchored to a carrier plate and a suspended retention means for holding the pipelines that is spaced therefrom and connected to the base by two or more flexible webs, the improvement wherein said flexible connecting webs are of meander-shape.

In this way, the retention shell is more softly sprung, especially transverse to the meander shape, and in a direction towards the base of the element. Its freedom of motion is limited only by the flexibility of the webs.

BRIEF DESCRIPTION OF THE DRAWINGS

An embodiment of the fastening element of the invention is illustrated in the drawings and will be explained in more detail below. Of the drawings:

FIG. 1 is a front elevational view of the fastening element.

FIG. 2 is a sectional view taken along the line II—II of FIG. 1.

FIG. 3 is a plan view of the fastening element.

FIG. 4 is a sectional view through the base of the fastening element taken along the line IV—IV of FIG. 1; and FIG. 5 shows a fastening element mounted to a carrier plate with the brake lines inserted in place.

DETAILED DESCRIPTION OF THE INVENTION

The fastening element shown in the drawing is intended for the vibration-damping holding of pipelines 4, especially the brake lines of motor vehicles, and is manufactured from a hard-elastic plastic.

It essentially comprises a base portion 1, having means for anchoring it to a carrier plate 5, and a holding portion 2 having retention means or shells 3 which engage around and hold inserted pipelines 4 in a clamping manner. The base can be anchored to carrier plate 5 in a known manner using a so-called T bolt 6. Other common types of anchoring means can also be used, such as, for example, screws, adhesives or rivets.

To damp the shocks or vibrations which occur in brake lines, particularly in an ABS system, the retention shells 3 are connected to the base 1 via a plurality of flexible strips or connecting webs 7. In accordance with the invention, these connecting webs 7 are of meander-shape or serpentine design forming a plurality of interconnected S shapes. Preferably, they are approximately as wide as retention shells 3, extend parallel to the latter between a yoke connecting the shells and the base and are symmetrical with one another, all as shown in the drawings. Preferably, the lower loops of the meandering webs 7, i.e., those near base 1, are connected to one another by straight, mutually parallel links 9.

By virtue of the meander design of the connecting webs 7, the retention shells 3 can deflect in all directions from their initial position. Deflection parallel to the carrier plate 5 is particularly obtainable due to this shape, while still allowing deflection, but to a lesser degree, in a direction perpendicular to the carrier plate.

What is claimed is:

1. A vibration-damping fastening element for holding pipelines comprising a base adapted to be anchored to a carrier plate, suspended retention means for holding the pipelines spaced from said base, said retention means comprising a pair of U-shaped retention shells for holding the pipelines spaced from and connected to each other by a yoke, each shell having a width in the longitudinal direction of the pipelines, and a pair of flexible connecting webs connected between said yoke and said base between the pair of shells, said webs being of meander-shape, symmetrical to one another between the yoke and the base and of the same width as said shells.

2. The vibration-damping fastening element of claim 1, wherein the meander-shaped connecting webs are formed of a plurality of connected loops and links and wherein the loops nearest the base are connected to one another by straight, parallel links.

* * * * *